United States Patent
Cho et al.

(10) Patent No.: US 10,537,003 B2
(45) Date of Patent: Jan. 14, 2020

(54) METHODS OF OPERATION OF SMART LIGHTING SYSTEMS

(71) Applicant: Samsung Electronics Co., Ltd., Suwon-si (KR)

(72) Inventors: Ho-Chan Cho, Suwon-si (KR); Jong-Hyun Kim, Yongin-si (KR); Sung-Hee You, Seoul (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 101 days.

(21) Appl. No.: 15/601,088

(22) Filed: May 22, 2017

(65) Prior Publication Data

US 2018/0139815 A1 May 17, 2018

(30) Foreign Application Priority Data

Nov. 15, 2016 (KR) ........................ 10-2016-0151638

(51) Int. Cl.
*H05B 33/08* (2006.01)
*H04L 12/28* (2006.01)
*H04W 88/02* (2009.01)
*H05B 37/02* (2006.01)

(52) U.S. Cl.
CPC ..... *H05B 33/0842* (2013.01); *H04L 12/2803* (2013.01); *H04W 88/021* (2013.01); *H05B 37/0272* (2013.01)

(58) Field of Classification Search
CPC ............ H05B 33/0842; H05B 37/0272; H05B 37/0281; H04L 12/282; H04L 12/2803
See application file for complete search history.

(56) References Cited

U.S. PATENT DOCUMENTS

| 9,179,526 | B2 | 11/2015 | Pedersen et al. | |
|---|---|---|---|---|
| 2013/0093334 | A1* | 4/2013 | Lin ..................... | H05B 33/0842 315/155 |
| 2013/0221852 | A1* | 8/2013 | Bowers .............. | H05B 33/0863 315/131 |
| 2014/0265938 | A1 | 9/2014 | Liu | |

(Continued)

FOREIGN PATENT DOCUMENTS

| KR | 2015-0028279 A | 3/2015 |
|---|---|---|
| KR | 10-1500030 B | 3/2016 |

(Continued)

*Primary Examiner* — Douglas W Owens
*Assistant Examiner* — Pedro C Fernandez
(74) *Attorney, Agent, or Firm* — Muir Patent Law, PLLC

(57) ABSTRACT

A method of operating a smart lighting system comprising a first mobile device, a lighting control device and first through nth (n being a positive integer) lighting devices, includes establishing, by the first mobile device, a first wireless connection with the lighting control device; performing, by the lighting control device, a first time synchronization with the first mobile device; providing, by the first mobile device, the lighting control device with a scheduling information representing operation of each of the first through nth lighting devices according to lapse of time; and controlling, by the lighting control device, operation of each of the first through nth lighting devices based on a current time and the scheduling information, wherein the current time is determined based on the time synchronization.

19 Claims, 11 Drawing Sheets

(56) References Cited

U.S. PATENT DOCUMENTS

2015/0351204 A1* 12/2015 Hershberg ......... H05B 37/0272
                  315/153
2016/0050723 A1* 2/2016 Gochnauer .......... H05B 33/086
                  315/151

FOREIGN PATENT DOCUMENTS

| | | |
|---|---|---|
| KR | 2016-0031922 A | 3/2016 |
| KR | 10-1557742 B | 10/2016 |

* cited by examiner

| LIGHTING_F | ON_TIME_F | SCENARIO_F | OFF_TIME_F |
|---|---|---|---|
| L1 | 13:00 | S2 | 15:00 |
| L2 | 09:00 | S1 | 18:00 |
| ⋮ | ⋮ | ⋮ | ⋮ |
| Ln | 07:00 | S3 | 12:00 |

METHODS OF OPERATION OF SMART LIGHTING SYSTEMS

CROSS-REFERENCE TO RELATED APPLICATION

This non-provisional U.S. patent application claims the benefit of priority under 35 U.S.C. § 119 to Korean Patent Application No. 10-2016-0151638, filed on Nov. 15, 2016, in the Korean Intellectual Property Office (KIPO), the disclosure of which is incorporated in its entirety by reference herein.

BACKGROUND

1. Technical Field

Exemplary embodiments relate smart lighting systems, and more particularly to methods of operation smart lighting systems by using mobile devices.

2. Discussion of the Related Art

In general, a lighting device is turned-on or turned-off using a power switch connected to the lighting device through a wiring.

Since the power switch is located at a fixed location, a user moves to the location where the power switch is located in order to turn the lighting device on or off.

Recently, as lighting devices have been developed, which are capable of performing a wireless communication with a mobile device such as a smartphone, research on a smart lighting system has been in progress, which controls a power of the lighting devices using a mobile device.

SUMMARY

Some exemplary embodiments are directed to provide a smart lighting system capable of providing exact controllability with increasing energy efficiency.

In some embodiments, the disclosure is directed to a method of operating a smart lighting system comprising a first mobile device, a lighting control device and first through nth lighting devices, where n is a positive integer, the method comprising: establishing, by the first mobile device, a first wireless connection with the lighting control device; performing, by the lighting control device, a first time synchronization with the first mobile device; providing, by the first mobile device, the lighting control device with scheduling information representing operating information of each of the first through nth lighting devices according to a lapse of time; and controlling, by the lighting control device, operation of the first through nth lighting devices based on a current time and the scheduling information, wherein the current time is determined based on the first time synchronization.

In some embodiments, the disclosure is directed to a method of operating a smart lighting system comprising a first mobile device, first through nth lighting control devices (n being a positive integer), and first through nth lighting devices, wherein each of the first through nth lighting devices is connected to a corresponding one of the first through nth lighting control devices, the method comprising: establishing, by the first mobile device, a wireless connection with each of the first through nth lighting control devices; performing, by each of the first through nth lighting control devices, a time synchronization with the first mobile device; providing, by the first mobile device, each of the first through nth lighting control devices with a corresponding one of first through nth scheduling information, the first through nth scheduling information indicating operation of a corresponding one of the first through nth lighting devices according to a lapse of time; and controlling, by the first through nth lighting control devices, operations of a corresponding one of the first through nth lighting devices based on a current time and the corresponding one of the first through nth scheduling information, wherein the current time is determined based on the time synchronization.

In some embodiments, the disclosure is directed to a method of operating a smart lighting system including a first mobile device, a lighting control device, and first through nth lighting devices, the method comprising: establishing a first wireless connection between the first mobile device and the lighting control device; performing, by the lighting control device, a first time synchronization including: receiving, from the first mobile device, a first master current time, when the first wireless connection is established between the first mobile device and the lighting control device, and determining, by the lighting control device, a current time based on the first master current time and an elapsed time that elapses from a time point at which the lighting control device receives the first master current time; receiving, by the lighting control device, scheduling information for each of the first through nth lighting devices; and controlling, by the lighting control device, operation of the first through nth lighting devices based on the current time and the scheduling information, wherein the current time is determined based on the first time synchronization, wherein n is a positive integer.

BRIEF DESCRIPTION OF THE DRAWINGS

Illustrative, non-limiting exemplary embodiments will be more clearly understood from the following detailed description in conjunction with the accompanying drawings.

FIG. 6 illustrates an exemplary scheduling table included in the lighting control device.

DETAILED DESCRIPTION OF THE EMBODIMENTS

Various exemplary embodiments will be described more fully hereinafter with reference to the accompanying drawings, in which some exemplary embodiments are shown.

It will be understood that, although the terms first, second, third etc. may be used herein to describe various elements, components, regions, layers and/or sections, these elements, components, regions, layers and/or sections should not be limited by these terms. Unless the context indicates otherwise, these terms are only used to distinguish one element, component, region, layer or section from another element, component, region, layer or section, for example as a naming convention. Thus, a first element, component, region, layer or section discussed below in one section of the specification could be termed a second element, component, region, layer or section in another section of the specification or in the claims without departing from the teachings of the present invention. In addition, in certain cases, even if a term is not described using "first," "second," etc., in the specification, it may still be referred to as "first" or "second" in a claim in order to distinguish different claimed elements from each other.

Figure 1:
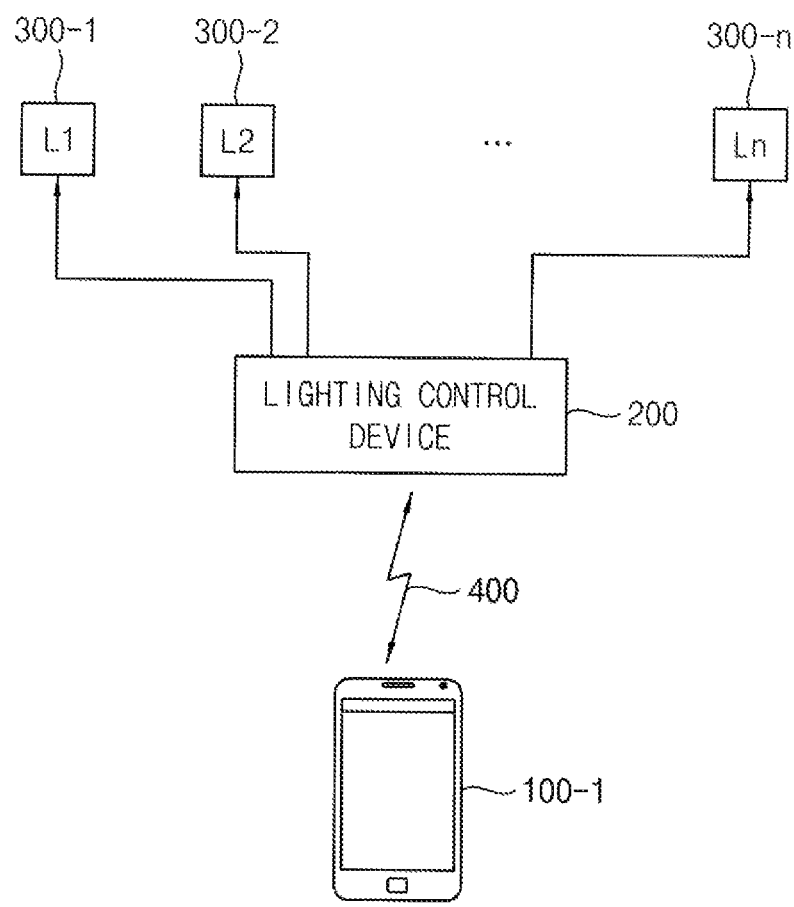
FIG. 1 is a block diagram illustrating a smart lighting system according to exemplary embodiments.

FIG. 1 is a block diagram illustrating a smart lighting system according to exemplary embodiments.

Referring to FIG. 1, a smart lighting system 10 may include a first mobile device 100-1, a lighting control device 200 and first through nth lighting devices 300-1~300-n, where n is a positive integer.

The first mobile device 100-1 and the lighting control device 200 may perform wireless communication with each other via a wireless connection 400 when the wireless connection 400 is established between the first mobile device 100-1 and the lighting control device 200. Wireless communication may refer to the connection and communication between two or more devices (e.g., the first mobile device 100-1 and the lighting control device 200) using a wireless signal using wireless communication technologies.

In an embodiment, the mobile device 100-1 and the lighting control device 200 may perform wireless communication according to a Bluetooth Low Energy (BLE) protocol. In another embodiment, the first mobile device 100-1 and the lighting control device 200 may perform wireless communication according to various wireless communication protocols (standards).

In an embodiment, the first mobile device 100-1 may include a smartphone. In another embodiment, the first mobile device 100-1 may include a tablet PC. The first mobile device 100-1 may be one of various mobile devices capable of performing wireless communication.

The lighting control device 200 may be connected to the first through nth lighting devices 300-1~300-n.

In an exemplary embodiment, the lighting control device 200 may be connected to the first through nth lighting devices 300-1~300-n through wirings. In some embodiments, the lighting control device 200 may be connected to the first through nth lighting devices 300-1~300-n through a wired and/or wireless network (not shown).

In an exemplary embodiment, each of the first through nth lighting devices 300-1~300-n may include a light emitting diode (LED) lighting device. In another embodiment, each of the first through nth lighting devices 300-1~300-n may include one of various lighting devices.

In the smart lighting system 10 shown in FIG. 1, a user provides control signals to the lighting control device 200 using the first mobile device 100-1 and the lighting control device 200 may control operation of each of the first through nth lighting devices 300-1~300-n based on the control signals. For example, the user may provide input to the first mobile device 100-1, and the first mobile device 100-1 may transform the user input into control signals and transmit the control signals to the lighting control device 200 via wireless communication 400. The lighting control device 200 may receive the control signals from the first mobile device 100-1, and may send instructions or control signals to the first through nth lighting devices 300-1~300-n via wired and/or wireless communication to control operation of the first through nth lighting devices 300-1~300-n. Each of the lighting control device 200 and the first through nth lighting devices 300-1~300-n may include hardware and/or software for controlling lights. For example the lighting control device 200 may include hardware (e.g., a memory, a controller, a Bluetooth chip and/or other networking hardware) and software programmed to receive instructions from the first mobile device 100-1 and to send control signals to the lighting devices 300-1~300-n. The lighting devices 300-1~300-n may include hardware and/or software configured to receive control signals from the lighting control device 200 in order to control various aspects of the lights to which they are connected. The lighting control device 200 may be a standalone device that plugs into a communication port or wirelessly communicates with lighting devices 300-1~300-n, or may be a device installed in a wall or other location in a building.

The user may turn-on or turn-off each of the first through nth lighting devices 300-1~300-n using the first mobile device 100-1. In addition, the user may control luminance and/or color of each of the first through nth lighting devices 300-1~300-n while the first through nth lighting devices 300-1~300-n are turned-on.

Figure 2:
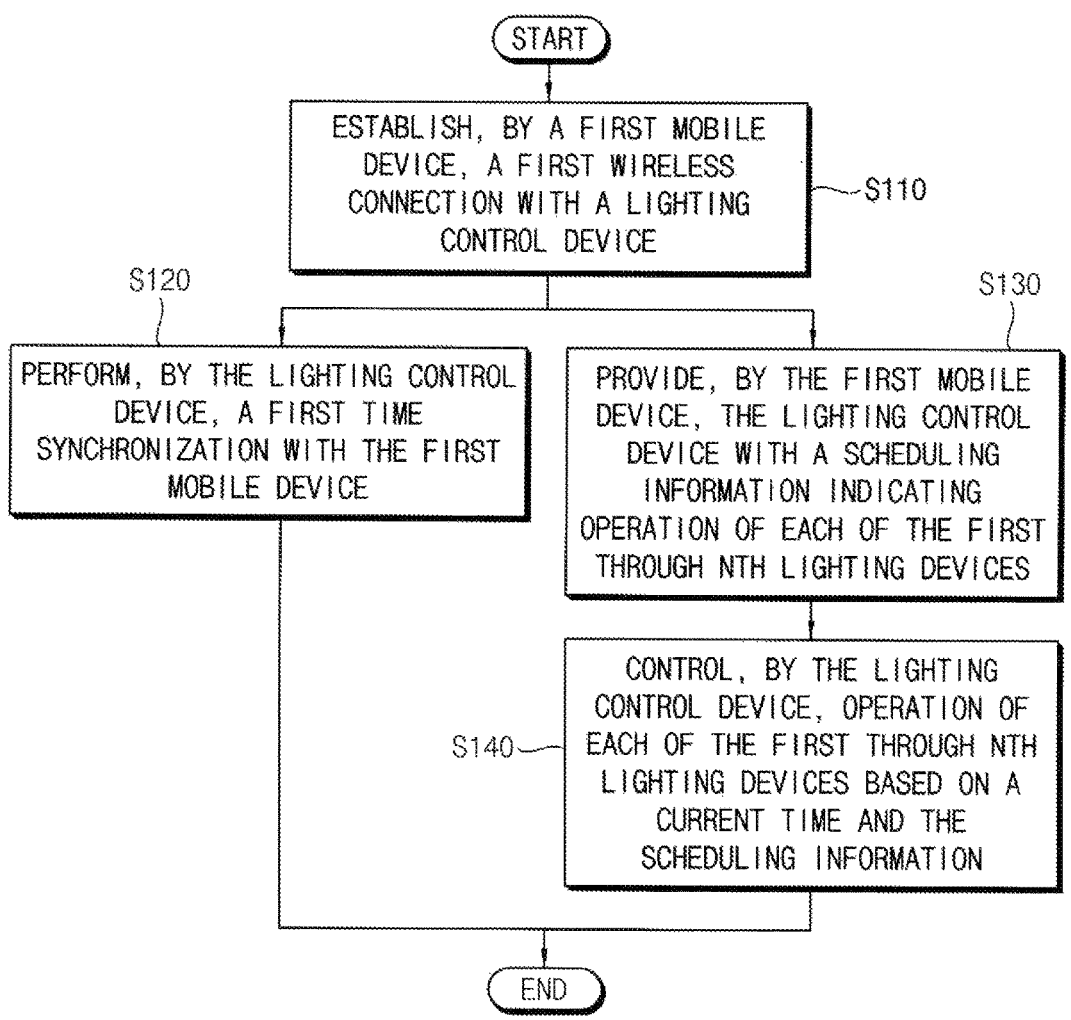
FIG. 2 is a flowchart illustrating a method of operating a smart lighting system according to exemplary embodiments.

FIG. 2 is a flowchart illustrating a method of operating a smart lighting system according to exemplary embodiments.

The method of operating a smart lighting system of FIG. 2 may be performed by the smart lighting system 10 of FIG. 1.

Hereinafter, there will be description on a method of operating the smart lighting system 10 with reference to FIGS. 1 and 2.

The first mobile device 100-1 and the lighting control device 200 may establish wireless connection (or, wireless communication) 400 (S110).

The first mobile device 100-1 and the lighting control device 200 may establish the wireless connection 400 with each other, for example, according to a networking or communication protocol such as the BLE protocol. For example, the first mobile device 100-1 and the lighting control device 200 may establish the wireless connection 400 with each other through an authentication process defined in the BLE protocol. After completion of the authentication process defined by the BLE protocol, the first mobile device 100-1 and the lighting control device 200 may be paired together, thereby allowing the first mobile device 100-1 and the lighting control device 200 to establish the wireless connection 400 and communicate wirelessly with one another.

Subsequently, after pairing between first mobile device 100-1 and the lighting control device 200 is completed, the first mobile device 100-1 may establish the wireless connection 400 with the lighting control device 200 without repeating the authentication process when the first mobile device 100-1 approaches the lighting control device 200. For example, in one embodiment, after authentication, the wireless connection 400 between the first mobile device 100-1 and the lighting control device 200 is established and maintained whenever the first mobile device 100-1 and the lighting control device 200 move close enough to one another to be within a communication range of one another (e.g., a range that allows for reception of communication signals transmitted from one of the first mobile device 100-1 and the lighting control device 200 to the other).

When the wireless connection 400 is established between the first mobile device 100-1 and the lighting control device 200, the lighting control device 200 performs a time synchronization with the first mobile device 100-1 (S120).

Figure 3:
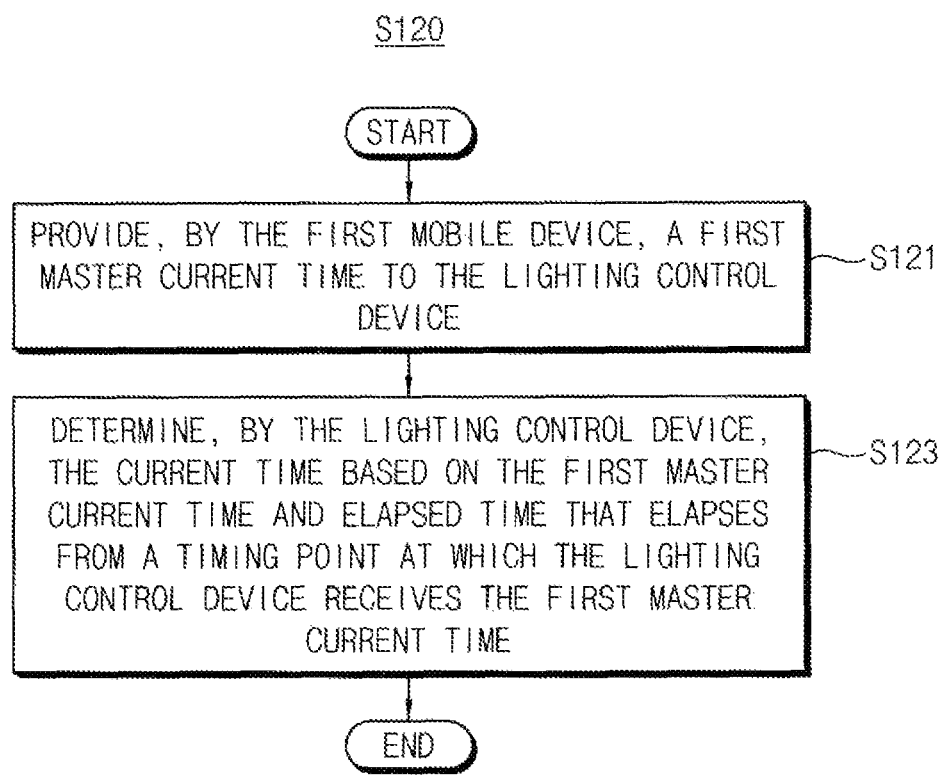
FIG. 3 is a flow chart illustrating an example in which the lighting control device performs a time synchronization with the first mobile device in FIG. 2.

FIG. 3 is a flow chart illustrating an example in which the lighting control device performs a time synchronization with the first mobile device, as illustrated in FIG. 2 (S120).

Referring to FIG. 3, when the wireless connection 400 is established between the first mobile device 100-1 and the lighting control device 200, the first mobile device 100-1 provides the lighting control device 200 with a first master current time (S121). The first mobile device 100-1 transmits the first master current time to the lighting control device 200 via the wireless connection 400.

In exemplary embodiments, the first mobile device 100-1 may set a current time based on a user's input. In other exemplary embodiments, the first mobile device 100-1 may set the current time through a communication with an external device, or simply based on the internal world clock of the first mobile device 100-1. The first mobile device 100-1 may provide the lighting control device 200 with the set current time as the first master current time. For example, the first mobile device 100-1 may obtain a set current time from an external device (e.g., a cellular communication tower, a base station, an access point, etc.) via a wireless communication network, and the first mobile device 100-1 may transmit the received current time to lighting control device 200 via the wireless connection 400.

The lighting control device 200 calculates an elapsed time, which elapses from a time point at which the lighting control device 200 receives the first master current time from the first mobile device 100-1, and determines a current time of the lighting control device 200 based on the elapsed time and the first master current time (S123). The time point may be the point in time at which the first master current time is received by the lighting control device 200. Once the current time of the lighting control device 200 is synchronized with the first mobile device 100-1, an internal clock of the lighting control device 200 may cycle the current time so that it maintains its synchronicity with the time calculated externally, including any first master current time that may be determined by the first mobile device 100-1. The amount of time cycled may correspond to the elapsed time. For example, the current time calculated by the lighting control device 200 may reflect the first master current time plus any elapsed time that has elapsed since receipt of the first master current time by the lighting control device 200.

In one embodiment, the lighting control device 200 performs the time synchronization with the first mobile device 100-1 each time the wireless connection 400 is established between the first mobile device 100-1 and the lighting control device 200.

Therefore, a current time of the lighting control device 200 may be synchronized with the current time of the first mobile device 100-1 whenever the wireless connection 400 is established between the first mobile device 100-1 and the lighting control device 200. This may assist the lighting control device 200, for example, in adjusting for a change in times, such as daylight savings time, or if the lighting control device 200 is moved to a different location having a different time zone, or if the lighting control device 200 had been shut off since its previous synchronization and/or otherwise lost track of the time.

Figure 4:
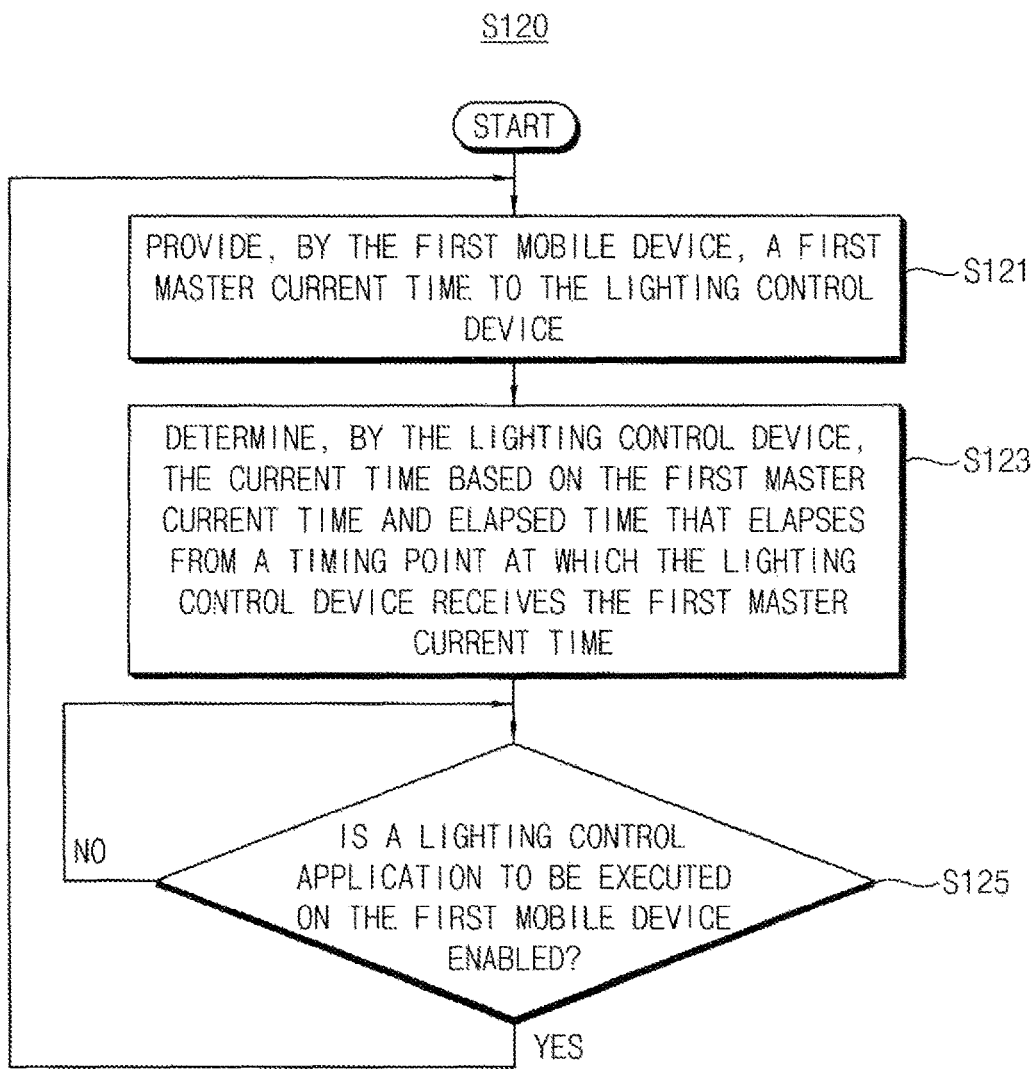
FIG. 4 is a flow chart illustrating another example in which the lighting control device performs a time synchronization with the first mobile device in FIG. 2.

FIG. 4 is a flow chart illustrating another example in which the lighting control device performs a time synchronization with the first mobile device, as illustrated in FIG. 2 (S120).

A method of FIG. 4 is different from the method FIG. 3 in that the method of FIG. 4 further includes a step (S125).

Referring to FIG. 4, when the wireless connection 400 is established between the first mobile device 100-1 and the lighting control device 200, the first mobile device 100-1 provides the lighting control device 200 with a first master current time (S121). The first mobile device 100-1 transmits the first master current time to the lighting control device 200 via the wireless connection 400.

The lighting control device 200 calculates an elapsed time which elapses from a time point at which the lighting control device 200 receives the first master current time, and determines a current time of the lighting control device 200 based on the elapsed time and the first master current time (S123).

Therefore, a current time of the lighting control device 200 may be synchronized with the current time of the first mobile device 100-1 whenever the wireless connection 400 is established between the first mobile device 100-1 and the lighting control device 200.

The first mobile device 100-1 determines whether a lighting control application to be executed on the first mobile device 100-1 is enabled (S125).

When the lighting control application is not enabled in the first mobile device 100-1 (NO in S125), the first mobile device 100-1 periodically determines whether the lighting control application is enabled (S125).

When the lighting control application is enabled in the first mobile device 100-1 (YES in S125), the first mobile device 100-1 provides the first master current time to the lighting control device 200 (S121).

In this case, the lighting control device 200 calculates an elapsed time which elapses from a time point at which the lighting control device 200 receives the first master current time, and determines a current time of the lighting control device 200 based on the elapsed time and the first master current time (S123).

As described with reference to FIG. 4, the current time of the lighting control device 200 may be synchronized with the current time of the first mobile device 100-1 whenever the wireless connection 400 is established between the first mobile device 100-1 and the lighting control device 200 and whenever the lighting control application is enabled in the first mobile device 100-1. For example, in the exemplary embodiment of FIG. 4, the current time of the lighting device may be synchronized with the current time of the first mobile device 100-1 at least two times (i.e., when the wireless connection 400 is established and when the lighting control application operating on the first mobile device 100-1 is opened or enabled). Therefore, the current time of the lighting control device 200 may match with the current time of the first mobile device 100-1 more accurately.

Referring again to FIG. 2, after the wireless connection 400 is established between the first mobile device 100-1 and the lighting control device 200, the first mobile device 100-1 may provide the lighting control device 200 with scheduling information, and the scheduling information may represent operating information of each of the first through nth lighting devices 300-1~300-n according to lapse of time (S130). For example, the operation of each of the first through nth lighting devices 300-1~300-n may be controlled by the lighting control device 200 based on the current time and the scheduling information.

Figure 5:
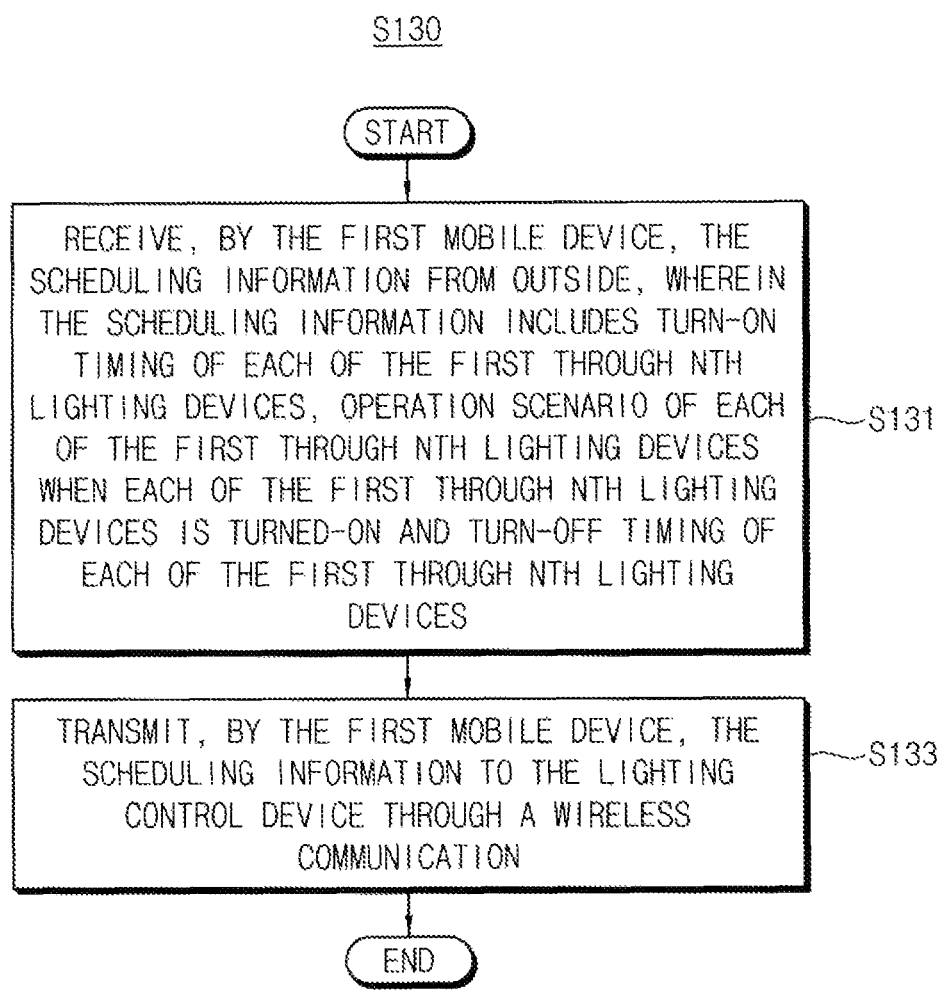
FIG. 5 is a flow chart illustrating an example in which the first mobile device of FIG. 2 provides the lighting control device with scheduling information of the first through nth mobile devices.

FIG. 5 is a flow chart illustrating an example that the first mobile device provides the lighting control device with scheduling information of the first through nth lighting devices, as illustrated in FIG. 2 (S130).

Referring to FIG. 5, the first mobile device 100-1 may receive the scheduling information from an outside or external source (S131). The outside or external source may be another electronic device and/or user input to the first mobile device 100-1. The scheduling information may include a turn-on timing of each of the first through nth lighting devices 300-1~300-n, an operation scenario of each of the first through nth lighting devices 300-1~300-n during a time period when each of the first through nth lighting devices 300-1~300-n is turned-on, and a turn-off timing of each of the first through nth lighting devices 300-1~300-n.

In exemplary embodiments, the operation scenario may include at least one of a luminance change and a color change of each of the first through nth lighting devices 300-1~300-n according to the lapse of time. In some embodiments, the operation scenario may include luminance and/or color change information according to a time schedule that operates according to the current time (e.g., the first master current time and the elapsed time).

For example, for each of the first through nth lighting devices 300-1~300-n, a brightness and/or intensity of the light emitted by the respective first through nth lighting devices 300-1~300-n may be set according to scheduling information received by, stored in, and/or transmitted by the first mobile device 100-1.

In exemplary embodiments, the first mobile device 100-1 may receive the scheduling information through a user's input. In exemplary embodiments, the first mobile device 100-1 may receive the scheduling information through communication with an external device. The first mobile device 100-1 may store the received scheduling information in a storage location of the first mobile device 100-1. The storage location may include, for example, a nonvolatile memory device configured to access and store data and information, including the scheduling information received by the first mobile device 100-1.

The first mobile device 100-1 may transmit the scheduling information to the lighting control device 200 via the wireless connection 400 (S133).

The lighting control device 200 may store the scheduling information therein as a scheduling table. For example, the lighting control device 200 may include a nonvolatile storage (for example, a nonvolatile memory device) and may store the scheduling information in the nonvolatile storage as the scheduling table. A controller on the lighting control device 200 may read the information stored on the nonvolatile storage in order to send signals to lighting devices 300-1~300-n for controlling the lighting devices.

FIG. 6 illustrates an exemplary scheduling table included in the lighting control device.

Referring to FIG. 6, a scheduling table ST may include a lighting device field LIGHTING_F, a turn-on timing field ON_TIME_F, a scenario field SCENARIO_F and a turn-off timing field OFF_TIME_F.

The lighting device field LIGHTING_F may store first values L1~Ln, and each of the first values L1~Ln represents a corresponding one of the first through nth lighting devices 300-1~300-n, the turn-on timing field ON_TIME_F may store second values, each representing turn-on timing of a corresponding one of the first through nth lighting devices 300-1~300-n, the scenario filed SCENARIO_F may store third values, each representing an operation scenario of a corresponding one of the first through nth lighting devices 300-1~300-n during which the corresponding one of the first through nth lighting devices 300-1~300-n is turned-on, and the turn-off timing field OFF_TIME_F may store fourth values, each representing turn-off timing of a corresponding one of the first through nth lighting devices 300-1~300-n.

As illustrated in FIG. 6, the operation scenario of each of the first through nth lighting devices 300-1~300-n when each of the first through nth lighting devices 300-1~300-n is turned-on may be one of a plurality of predetermined operation scenarios S1, S2 and S3. In some embodiments, the predetermined operation scenarios S1, S2 and S3 may correspond to operation scenario values stored in one or more other tables. For example, predetermined operation scenario S1 may include values corresponding to one or more of a first turn-on time, first luminance value and/or first color value, predetermined operation scenario S2 may include values corresponding to one or more of a second turn-on time, a second luminance value and/or second color value, and predetermined operation scenario S3 may include values corresponding to one or more of a third turn-on time, a third luminance value and/or third color value.

Although it is illustrated in FIG. 6 that the scheduling table ST may store one setting information for each of the first through nth lighting devices 300-1~300-n, the scheduling table ST may store a plurality of setting information for each of the first through nth lighting devices 300-1~300-n. For example, for first value L1, the corresponding turn-on timing field ON_TIME_F may store a plurality of second values defining multiple turn-on times for first value L1, and the corresponding turn-off timing field OFF_TIME_F may store multiple fourth values defining multiple turn-off times for first value L1.

Referring again to FIG. 2, the lighting control device 200 may control operation of each of the first through nth lighting devices 300-1~300-n based on the scheduling information and a current time which is determined based on the time synchronization (S140).

Figure 7:
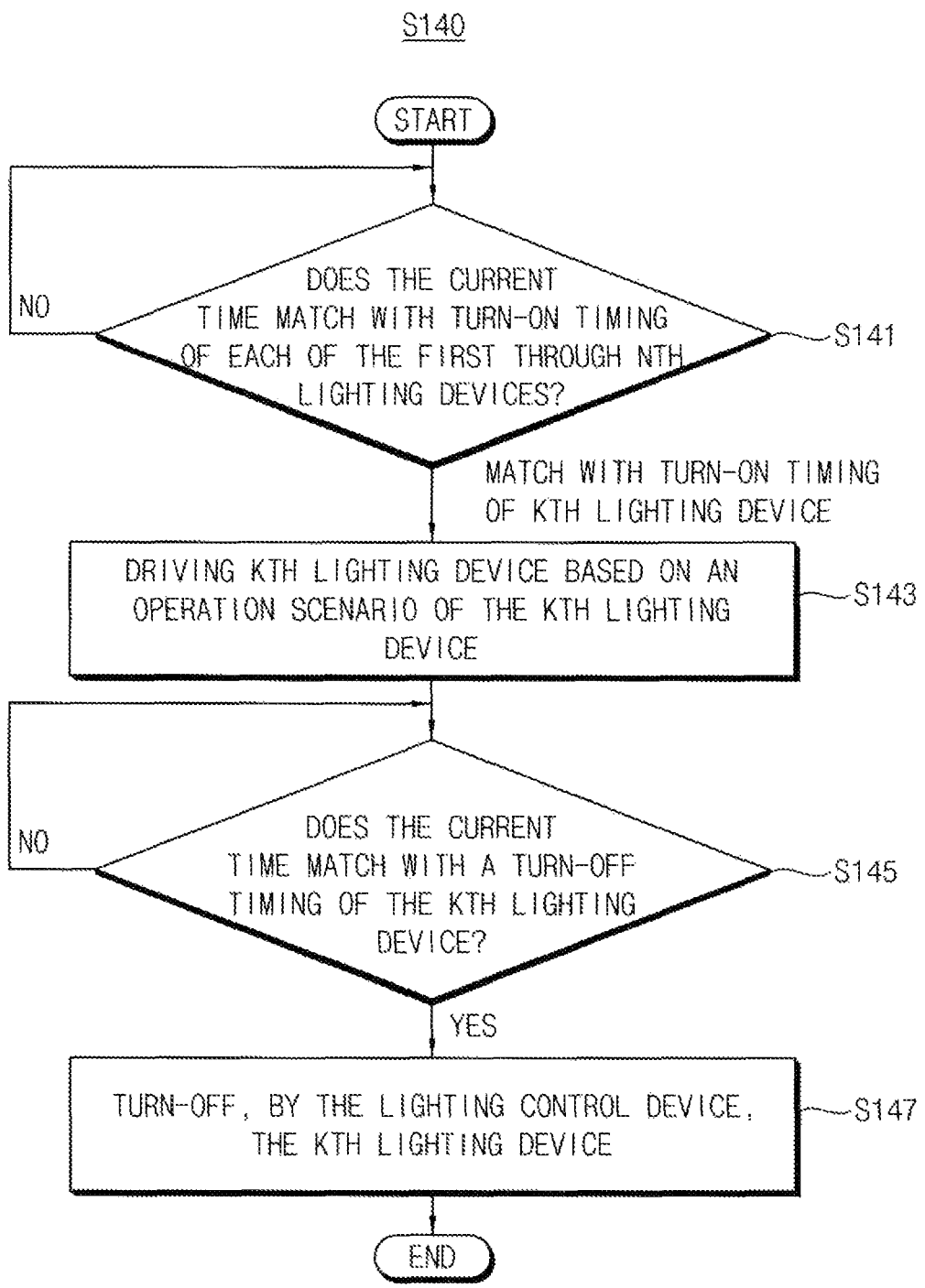
FIG. 7 is a flow chart illustrating an example in which the lighting control device controls operation of each of the first through nth lighting devices based on the scheduling information and a current time in FIG. 2.

FIG. 7 is a flow chart illustrating an example in which the lighting control device 200 controls operation of each of the first through nth lighting devices based on the scheduling information and a current time, as illustrated in FIG. 2 (S140).

As described above, the lighting control device 200 calculates an elapsed time which elapses from a time point at which the lighting control device 200 receives the first master current time from the first mobile device 100-1 and determines a current time of the lighting control device 200 based on the elapsed time and the first master current time.

The lighting control device 200 may determine whether the current time matches with the turn-on timing of each of the first through nth lighting device 300-1~300-n (S141).

For example, the lighting control device 200 may determine whether the current time matches with the turn-on timing of each of the first through nth lighting device 300-1~300-n by comparing the current time with values in the turn-on timing field ON_TIME_F in the scheduling table ST. The current time may reflect the first master current time originally set by the lighting control device 200 during synchronization plus any time that has elapsed since.

When the current time matches with a turn-on timing of a kth lighting device 300-k of the first through nth lighting device 300-1~300-n, the lighting control device 200 drives the kth lighting device 300-k based on an operation scenario of the kth lighting device 300-k, included in the scheduling information (S143). For example, the lighting control device 200 may control the kth lighting device 300-k, causing the kth lighting device 300-k to turn on and operate according to the operation scenario corresponding to the kth lighting device 300-k. Here, k is a positive integer smaller than or equal to n.

The lighting control device 200 may determine whether the current time matches with the turn-off timing of each of the kth lighting device 300-k, included in the scheduling information (S145).

For example, the lighting control device 200 may determine whether the current time matches with the turn-off timing of each of the kth lighting device 300-k by comparing the current time with a value of the kth lighting device 300-k in the turn-off timing field OFF_TIME_F in the scheduling table ST.

When the current time matches with a turn-off timing of the kth lighting device 300-k, included in the scheduling information, the lighting control device 200 turns-off the kth lighting device 300-k (S147).

When the first mobile device 100-1 stores the scheduling information and the first mobile device 100-1 drives the first through nth lighting device 300-1~300-n, the lighting control application is always executed on the first mobile device 100-1.

Therefore, power consumed in a battery of the first mobile device 100-1 increases and heating phenomenon of the first mobile device 100-1 increases. For example, the lighting control application resident on the first mobile device 100-1 may operate continuously in order to provide the functionality to store the scheduling information and drive the first through nth lighting device 300-1~300-n, thereby depleting the battery and increasing the heat of the first mobile device 100-1.

However, according to a method of operating the smart lighting system 10 as described with reference to FIGS. 1 through 7, the first mobile device 100-1 provides the scheduling information to the lighting control device 200 and the lighting control device 200 stores the scheduling information therein as the scheduling table ST. In addition, the lighting control device 200 may drive the first through nth lighting devices 300-1~300-n by comparing the scheduling information with a current time which is determined based on the time synchronization performed between the first mobile device 100-1 and the lighting control device 200.

Therefore, the method of operating the smart lighting system 10 may control the first through nth lighting devices 300-1~300-n based on accurate time while reducing the power consumed in the battery and decreasing the heating phenomenon of the first mobile device 100-1.

Figure 8:
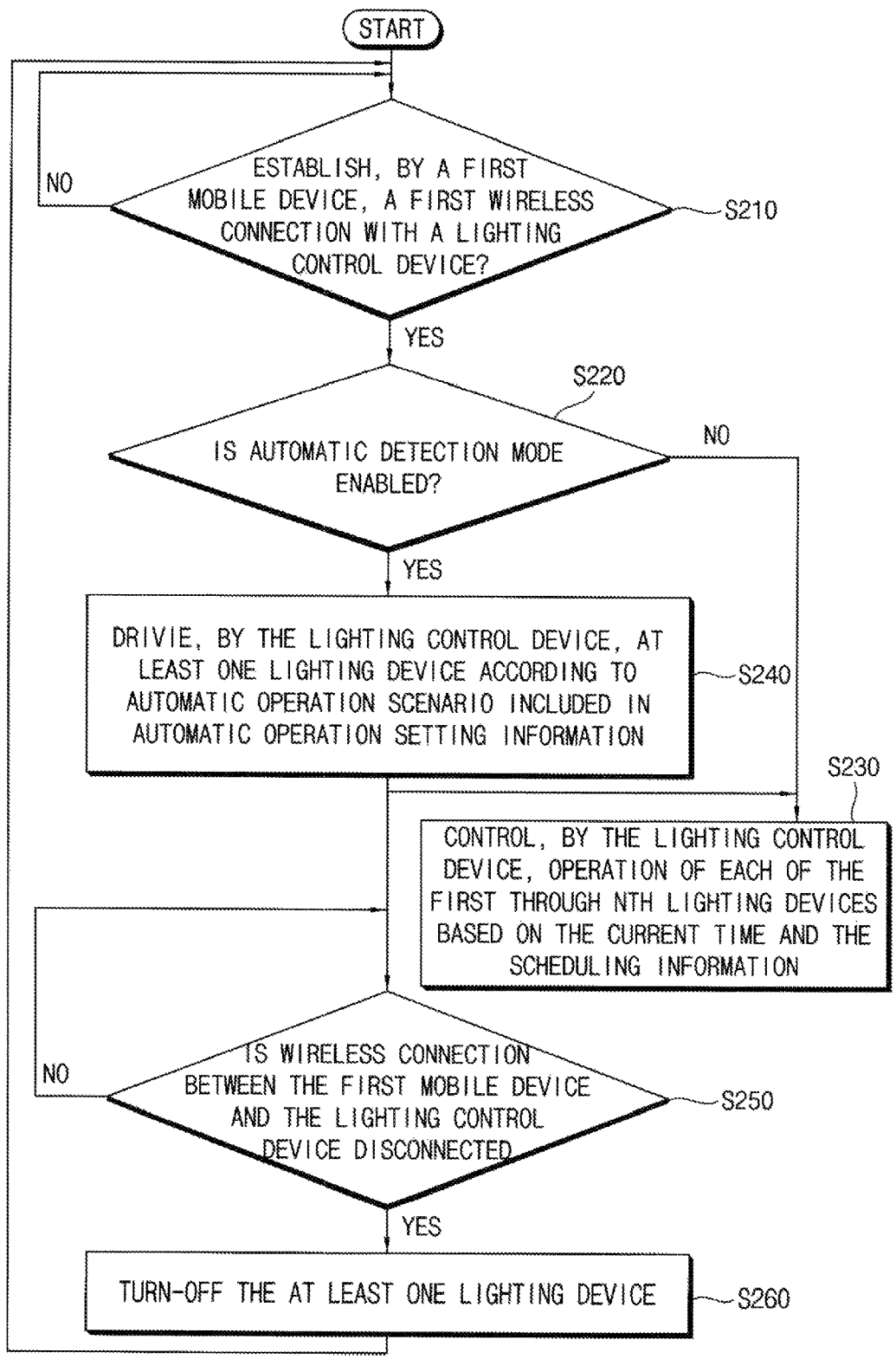
FIG. 8 is a flow chart illustrating an example of operation of the lighting control device in FIG. 2 according to exemplary embodiments.

FIG. 8 is a flow chart illustrating an example of operation of the lighting control device according to exemplary embodiments.

In exemplary embodiments, when the wireless communication 400 is established between the first mobile device 100-1 and the lighting control device 200, the first mobile device 100-1 may provide the lighting control device 200 with an automatic operation setting information which includes information of at least one lighting device of the first through nth lighting devices 300-1~300-n to be turned-on automatically and an automatic operation scenario of the at least one lighting device.

In exemplary embodiments, the first mobile device 100-1 may determine one of a plurality of operation scenarios as the automatic operation scenario based on a user input.

In addition, the first mobile device 100-1 may provide the lighting control device 200 with a control signal designating an automatic detection mode. For example, the first mobile device 100-1 may transmit a control signal to the lighting control device 200, and the control signal may cause the lighting control device 200 to drive operation of at least one lighting device of the first through nth lighting devices 300-1~300-n.

As illustrated in FIG. 8, when the lighting control device 200 is booted (or, powered-on), the lighting control device 200 determines whether the wireless connection 400 is established between the first mobile device 100-1 and the lighting control device 200 (S210). The lighting control device 200 may monitor the wireless connection 400 so as to determine periodically if the wireless connection 400 is established between the first mobile device 100-1 and the lighting control device 200. When the lighting control device 200 determines that the wireless connection 400 is not established (NO in S210), the lighting control device 200 may periodically check the status of the wireless connection 400 to determine if the wireless connection 400 is established between the first mobile device 100-1 and the lighting control device 200 (S210).

When the wireless connection 400 is established between the first mobile device 100-1 and the lighting control device 200 (YES in S210), the lighting control device 200 determines whether the automatic detection mode is enabled (S220).

When the automatic detection mode is not enabled (NO in S220), the lighting control device 200 may control operation of each of the first through nth lighting devices 300-1~300-n based on the scheduling information and a current time which is determined based on the time synchronization performed between the first mobile device 100-1 and the lighting control device 200 (S230) as described with reference to FIG. 7. The lighting control device 200 may control operation of each of the first through nth lighting devices 300-1~300-n individually or separately from one another.

When the automatic detection mode is enabled (YES in S220), the lighting control device 200 drives the at least one lighting device according to the automatic operation scenario included in the automatic operation setting information (S240). For example, this automatic operation setting scenario and automatic operation setting information may be a pre-stored or default scenario installed on the lighting control device 200 upon manufacturing, or a scenario set directly on the lighting control device 200 without the use of the first mobile device 100-1. In some embodiments, the automatic operation scenario may include information such as, for example, turn-on and/or turn-off one or more of the first through nth lighting devices 300-1~300-n, as well as luminance and/or color of the one or more of the first through nth lighting devices 300-1~300-n while the first through nth lighting devices 300-1~300-n are turned-on. The automatic operation scenario may be stored in a table in the lighting control device 200. In some embodiments, the lighting control device 200 may have stored thereon a plurality of different automatic operation scenarios. Alternatively, this automatic operation setting scenario and automatic operation setting information may be a pre-stored or default scenario installed on the lighting control device 200 by a user, or a scenario set directly on the lighting control device 200 by the user without the use of the first mobile device 100-1.

In addition, the lighting control device 200 may control of operation of each of the first through nth lighting devices 300-1~300-n based on the scheduling information and a current time which is determined based on the time synchronization performed between the first mobile device 100-1 and the lighting control device 200 (S230). In some embodiments, the lighting control device 200 controls at least one lighting device of the first through nth lighting devices 300-1~300-n according to the automatic operation scenario included in the automatic operation setting information, and controls operation of the other first through nth lighting devices 300-1~300-n (e.g., lighting devices other than the at least one lighting device) based on the scheduling information and a current time.

The lighting control device 200 determines whether the wireless connection 400 is disconnected between the first mobile device 100-1 and the lighting control device 200 (S250). The wireless connection 400 may be disconnected if, for example, the lighting control device 200 and the first mobile device 100-1 are no longer within a communication ranger of one another.

When the wireless connection 400 between the first mobile device 100-1 and the lighting control device 200 is maintained (NO in S250), the lighting control device 200 consistently drives the at least one lighting device according to the automatic operation scenario included in the automatic operation setting information. The lighting control device 200 may monitor the wireless connection 400 so as to determine periodically if the wireless connection 400 is disconnected between the first mobile device 100-1 and the lighting control device 200.

When the wireless connection 400 between the first mobile device 100-1 and the lighting control device 200 is disconnected (YES in S250), the lighting control device 200 turns-off the at least one lighting device (S260).

In some embodiments, the lighting control device 200 may periodically re-check the status of the wireless connection 400 to determine if the wireless connection 400 has been established between the first mobile device 100-1 and the lighting control device 200 (S210). When the wireless connection 400 is re-established, the process of FIG. 8 may repeat itself.

As described above, when the wireless connection 400 is established between the first mobile device 100-1 and the lighting control device 200 as the first mobile device 100-1 approaches the lighting control device 200 with the automatic detection mode being enabled, the lighting control device 200 drives the at least one lighting device according to the automatic operation scenario included in the automatic operation setting information. In one embodiment, when the wireless connection 400 between the first mobile device 100-1 and the lighting control device 200 is disconnected as the first mobile device 100-1 goes apart from the lighting control device 200 (e.g., when they are no longer within a communication range of one another), the lighting control device 200 automatically turns-off the at least one lighting device.

Figure 9:
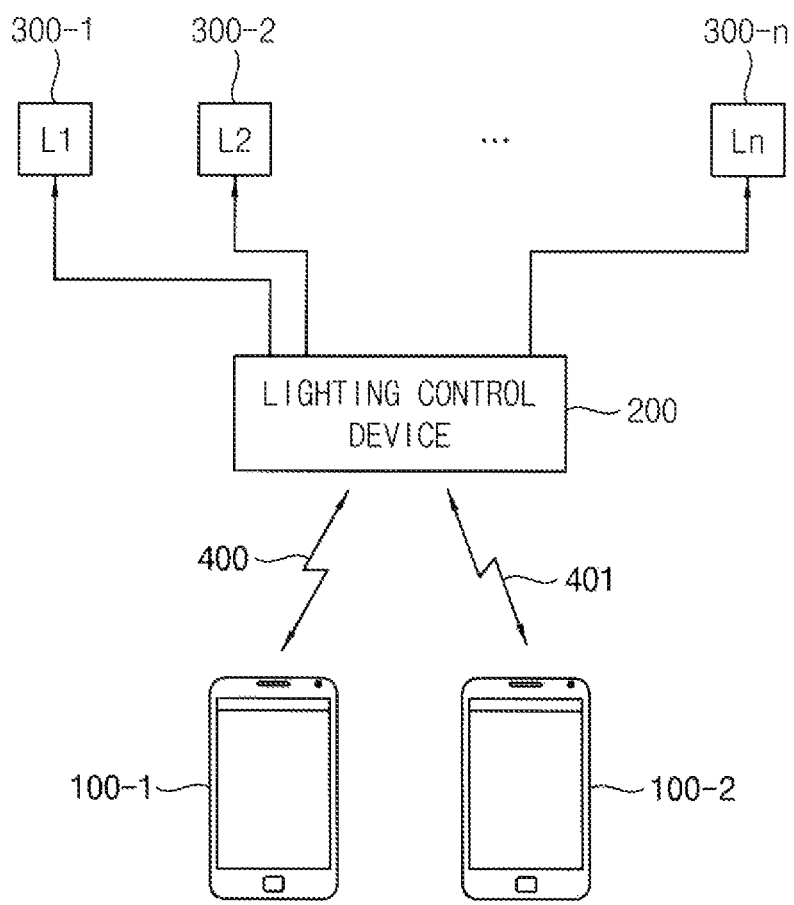
FIG. 9 is a block diagram illustrating a smart lighting system according to exemplary embodiments.

FIG. 9 is a block diagram illustrating a smart lighting system according to exemplary embodiments.

A smart lighting system 10a is different from the smart lighting system 10 in that the smart lighting system 10a further includes a second mobile device 100-2.

As described with reference to FIGS. 1 through 8, the first mobile device 100-1 provides the scheduling information to the lighting control device 200 and the lighting control device 200 may control of operation of each of the first through nth lighting devices 300-1~300-n based on the scheduling information and a current time which is determined based on the time synchronization performed between the first mobile device 100-1 and the lighting control device 200.

When the second mobile device 100-2 approaches the lighting control device 200, the second mobile device 100-2 and the lighting control device 200 may establish a wireless connection 401.

The second mobile device 100-2 and the lighting control device 200 may establish the wireless connection 401 with each other according to the BLE protocol. The second mobile device 100-2 and the lighting control device 200 may establish the wireless connection 401 with each other through an authentication process defined in the BLE protocol. The second mobile device 100-2 and the lighting control device 200 may establish the wireless connection 401 in a manner similar to that described above in connection with first mobile device 100-1 and wireless connection 400.

In an embodiment, the second mobile device 100-2 may include a smartphone. In another embodiment, the second mobile device 100-2 may include a tablet PC. The second mobile device 100-2 may be one of various mobile devices capable of performing wireless communication.

When the wireless connection 401 is established between the second mobile device 100-2 and the lighting control device 200, the lighting control device 200 performs a time synchronization with the second mobile device 100-2.

The lighting control device 200 may perform the time synchronization with the second mobile device 100-2 according to one of the time synchronization process of FIG. 2 and the time synchronization process of FIG. 3. In some embodiments, the time synchronization between the lighting control device 200 and the second mobile device 100-2 may override the time synchronization between the lighting control device 200 and the first mobile device 100-1. For example, the lighting control device 200 may operate according to the time synchronization with the second mobile device 100-2.

The lighting control device 200 provides the second mobile device 100-2 with the scheduling information corresponding to the scheduling table ST stored therein.

Therefore, the second mobile device 100-2 may receive the scheduling information from the lighting control device 200 which is provided to the lighting control device 200 by the first mobile device 100-1 without being synchronized with the first mobile device 100-1.

The second mobile device 100-2 may update the scheduling information based on a user's input (e.g., user input to the second mobile device 100-2), and may provide the undated scheduling information to the lighting control device 200.

In this case, the lighting control device 200 may control of operation of each of the first through nth lighting devices 300-1~300-n based on the updated scheduling information and a current time which is determined based on the time synchronization performed between the second mobile device 100-2 and the lighting control device 200.

Figure 10:
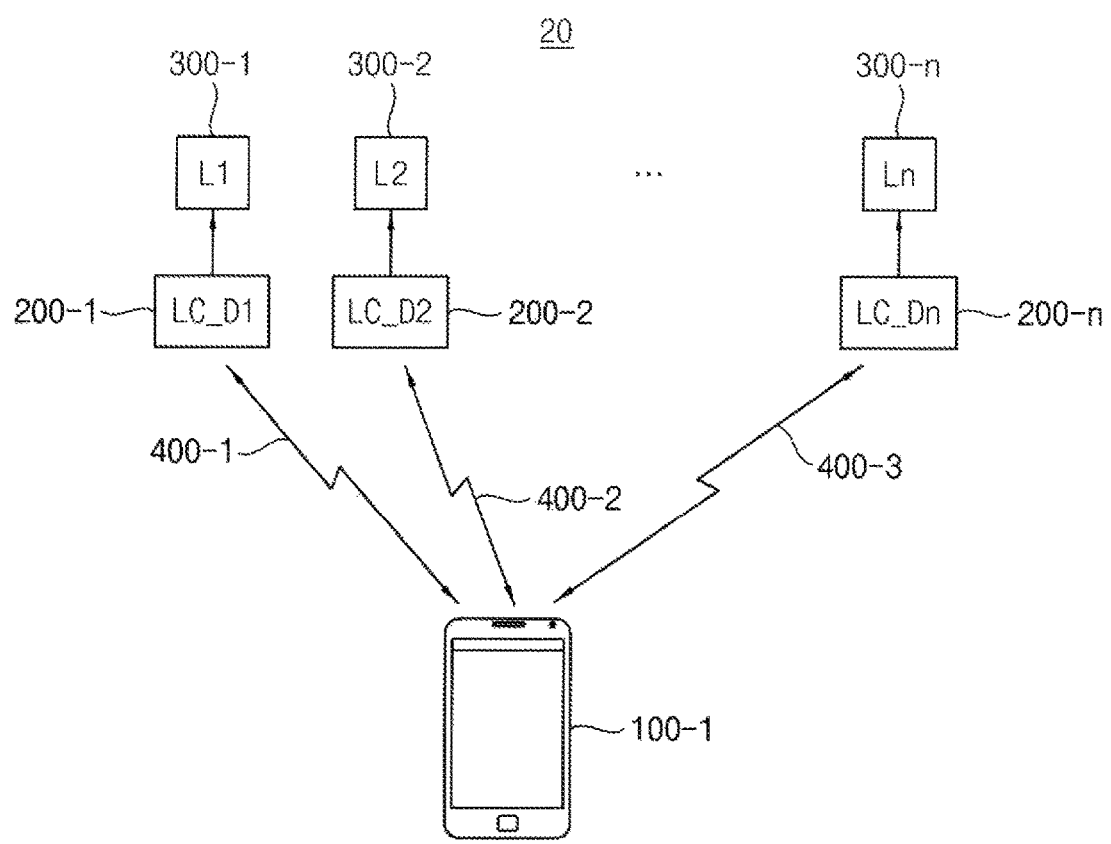
FIG. 10 is a block diagram illustrating a smart lighting system according to exemplary embodiments.

FIG. 10 is a block diagram illustrating a smart lighting system according to exemplary embodiments.

Referring to FIG. 10, a smart lighting system 20 may include a first mobile device 100-1, first through nth lighting control devices 200-1~200-n and first through nth lighting devices 300-1~300-n. Here, n is a positive integer.

The first mobile device 100-1 and each of the first through nth lighting control devices 200-1~200-n may perform a wireless communication with each other via a respective wireless connection 400-1~400-*n* based on each identifier of the first through nth lighting control devices 200-1~200-*n*.

In an embodiment, the mobile device 100-1 and each of the first through nth lighting control devices 200-1~200-*n* may perform a wireless communication according to a BLE protocol. In another embodiment, the mobile device 100-1 and each of the first through nth lighting control devices 200-1~200-*n* may perform wireless communication according to various wireless communication protocols (standards).

Each of the first through nth lighting control devices 200-1~200-*n* is connected to a corresponding one of the first through nth lighting devices 300-1~300-*n*.

In an exemplary embodiment, each of the first through nth lighting control devices 200-1~200-*n* is connected to a corresponding one of the first through nth lighting devices 300-1~300-*n* through a wiring. For example, each of the first through nth lighting control devices 200-1~200-*n* may have a one-to-one relationship with a corresponding one of the first through nth lighting devices 300-1~300-*n*.

In the smart lighting system of FIG. 10, a user provides controls signals to each of the first through nth lighting control devices 200-1~200-*n* using the first mobile device 100-1. For example, the user may provide input to the first mobile device 100-1 via a user interface of a lighting control application of the first mobile device 100-1, and the first mobile device 100-1 may translate the user input into one or more control signals, which the first mobile device 100-1 transmits to one or more of the first through nth lighting control devices 200-1~200-*n* via a corresponding wireless connection 400-1~400-*n*. Based on the control signals received from the first mobile device 100-1 via a corresponding one of the wireless connections 400-1~400-*n*, each of the first through nth lighting control devices 200-1~200-*n* may control operation of a corresponding one of the first through nth lighting devices 300-1~300-*n*.

For example, the user may turn-on or turn-off one or more of the first through nth lighting devices 300-1~300-*n* using the first mobile device 100-1. In addition, the user may control luminance and/or color of each of the first through nth lighting devices 300-1~300-*n* while the first through nth lighting devices 300-1~300-*n* are turned-on.

Figure 11:
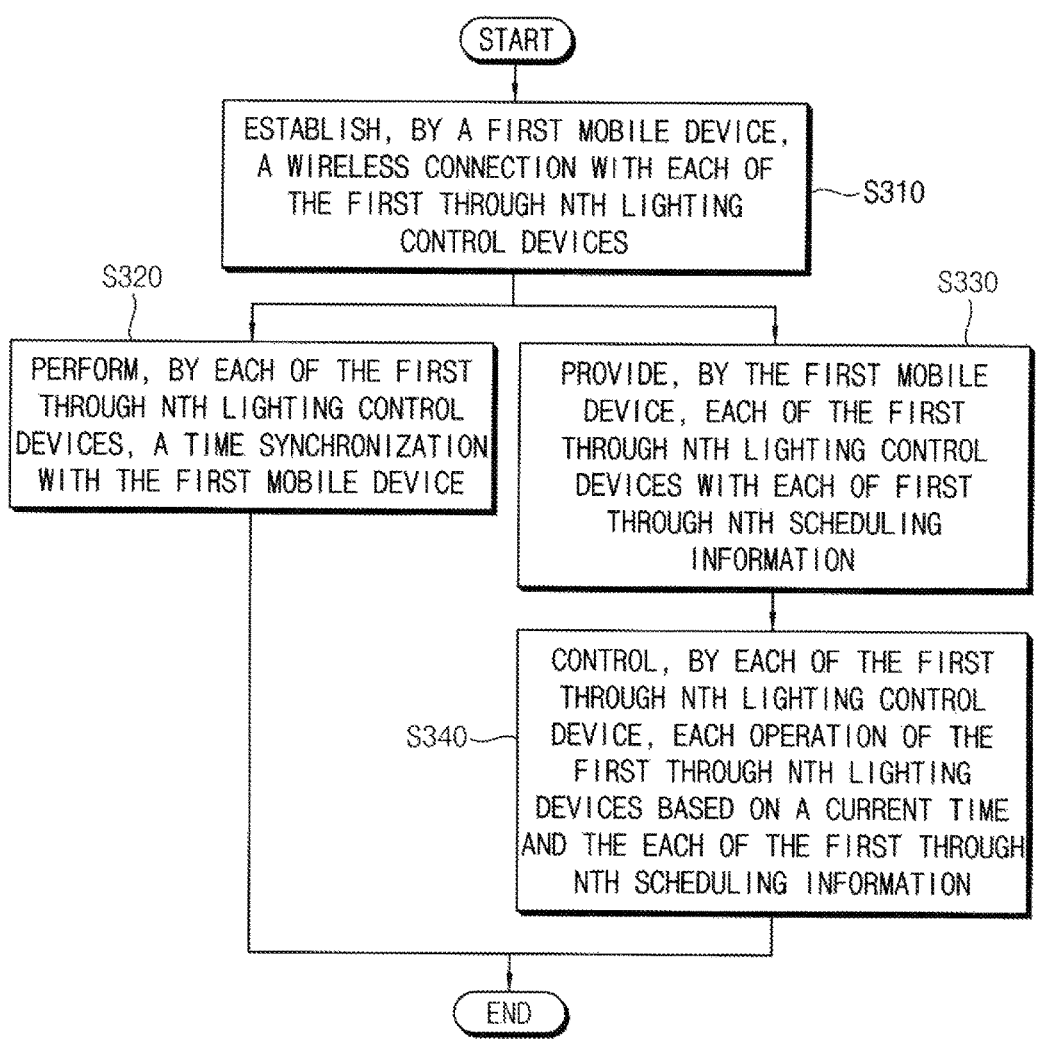
FIG. 11 is a flowchart illustrating a method of operating a smart lighting system according to exemplary embodiments.

FIG. 11 is a flowchart illustrating a method of operating a smart lighting system according to exemplary embodiments.

The method of operating a smart lighting system of FIG. 11 may be performed by the smart lighting system 20 of FIG. 10.

Hereinafter, there will be description on a method of operating the smart lighting system 20 with reference to FIGS. 10 and 11.

The first mobile device 100-1 and each of the lighting control devices 200-1~200-*n* may establish a wireless connection 400-1~400-*n*, respectively (S310).

The first mobile device 100-1 and each of the lighting control devices 200-1~200-*n* may establish the respective wireless connections 400-1~400-*n* with each other according to the BLE protocol. The first mobile device 100-1 and each of the lighting control devices 200-1~200-*n* may establish the respective wireless connections 400-1~400-*n* with each other through an authentication process defined in the BLE protocol. After completion of the authentication process defined by the BLE protocol, the first mobile device 100-1 and each of the lighting control devices 200-1~200-*n* may be paired together, thereby allowing the first mobile device 100-1 and the lighting control devices 200-1~200-*n* to establish the wireless connections 400-1~400-*n* and communicate wirelessly with one another.

When the wireless connections 400-1~400-*n* are established between the first mobile device 100-1 and each of the lighting control devices 200-1~200-*n*, each of the lighting control devices 200-1~200-*n* performs a time synchronization with the first mobile device 100-1 (S320).

Each of the lighting control devices 200-1~200-*n* may perform the time synchronization with the first mobile device 100-1 according to one of the time synchronization process of FIG. 2 and the time synchronization process of FIG. 3.

After the wireless connections 400-1~400-*n* are established between the first mobile device 100-1 and each of the lighting control devices 200-1~200-*n*, the first mobile device 100-1 may provide each of the lighting control devices 200-1~200-*n* with a corresponding one of first through nth scheduling information, and the each of the first through nth scheduling information may indicate operation of corresponding one of the first through nth lighting devices 300-1~300-*n* according to the elapsed time (S330).

The first mobile device 100-1 may provide each of the lighting control devices 200-1~200-*n* with a corresponding one of first through nth scheduling information, as described with reference to FIGS. 5 and 6.

In exemplary embodiments, the first mobile device 100-1 may receive, via a user input, the scheduling information including turn-on timing of each of the first through nth lighting devices 300-1~300-*n*, operation scenario of each of the first through nth lighting devices 300-1~300-*n* during periods in which each of the first through nth lighting devices 300-1~300-*n* is turned-on, and turn-off timing of each of the first through nth lighting devices 300-1~300-*n*. The first mobile device 100-1 may separate scheduling setting associated with the kth lighting device 300-*k* from the scheduling information (i.e., kth scheduling information), and may provide the kth scheduling information to a kth lighting device 300-*k* of the first through nth lighting devices 300-1~300-*n*.

Each of the first through nth lighting control device 200-1~200-*n* may control operation of a corresponding one of the first through nth lighting devices 300-1~300-*n* based on corresponding scheduling information and a current time which is determined based on the time synchronization (S340).

In exemplary embodiments, each of the first through nth lighting control device 200-1~200-*n* may control operation of a corresponding one of the first through nth lighting devices 300-1~300-*n* according to the same process as the lighting control device 200 controls operation of each of the first through nth lighting devices 300-1~300-*n*, as discussed in connection with FIG. 7.

As described with reference to FIGS. 1 through 11, the method of operating the smart lighting system 10 or 20 may control the first through nth lighting devices 300-1~300-*n* based on accurate time information, while reducing the power consumed in the battery and heating phenomenon.

The present disclosure may be applied to various smart lighting systems which control operation of smart lighting devices by using mobile devices.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present disclosure. Accordingly, all such modifications are intended to be included within the scope of the present disclosure as defined in the claims.

What is claimed is:

1. A method of operating a smart lighting system comprising a first mobile device, a lighting control device and first through nth lighting devices, where n is a positive integer greater than 1, the method comprising:
   establishing, by the first mobile device, a first wireless connection with the lighting control device;
   performing, by the lighting control device, a first time synchronization with the first mobile device;
   providing, by the first mobile device, the lighting control device with scheduling information representing operating information of each of the first through nth lighting devices according to a time schedule;
   storing, in a memory of the lighting control device, the scheduling information;
   calculating, by the lighting control device, a current time;
   controlling, by the lighting control device, operation of the first through nth lighting devices based on the current time calculated by the lighting control device and the scheduling information stored in the memory of the lighting control device;
   establishing, by a second mobile device, a second wireless connection with the lighting control device;
   performing, by the lighting control device, a second time synchronization with the second mobile device;
   providing, by the lighting control device, the scheduling information to the second mobile device; and
   updating, by the second mobile device, the scheduling information to provide updated scheduling information to the lighting control device,
   wherein the current time is determined based on the first time synchronization.

2. The method of claim 1, wherein the performing, by the lighting control device, the first time synchronization with the first mobile device comprises:
   providing, by the first mobile device, a first master current time to the lighting control device, when the first wireless connection is established between the first mobile device and the lighting control device; and
   calculating, by the lighting control device, the current time based on the first master current time and an elapsed time that elapses from a time point at which the lighting control device receives the first master current time from the first mobile device.

3. The method of claim 1, wherein the performing, by the lighting control device, the first time synchronization with the first mobile device further comprises:
   providing, by the first mobile device, a first master current time to the lighting control device, when a lighting control application is enabled in the first mobile device, wherein the lighting control application executes on the first mobile device to control the lighting control device; and
   calculating, by the lighting control device, the current time based on the first master current time and an elapsed time that elapses from a time point at which the lighting control device receives the first master current time.

4. The method of claim 1, wherein the providing, by the first mobile device, the lighting control device with the scheduling information comprises:
   receiving, by the first mobile device, the scheduling information from an external source, wherein the scheduling information includes a turn-on timing of each of the first through nth lighting devices, an operation scenario of each of the first through nth lighting devices during a period when each of the first through nth lighting devices is turned-on, and a turn-off timing of each of the first through nth lighting devices; and
   transmitting, by the first mobile device, the scheduling information to the lighting control device through a wireless communication via the first wireless connection.

5. The method of claim 4, wherein the operation scenario includes at least one of a luminance change and a color change of each of the first through nth lighting devices according to the time schedule.

6. The method of claim 4, wherein the controlling, by the lighting control device, the operation of the first through nth lighting devices comprises:
   driving a kth lighting device of the first through nth lighting devices based on a kth operation scenario of the kth lighting device when the current time matches with a kth turn-on timing of the kth lighting device, wherein k is a positive integer smaller than or equal to n, and the kth turn-on timing of the kth lighting device is included in the scheduling information; and
   turning-off, by the lighting control device, the kth lighting device, when the current time matches with a kth turn-off timing of the kth lighting device, wherein the kth turn-off timing of the kth lighting device is included in the scheduling information.

7. The method of claim 1, further comprising:
   providing, by the first mobile device, the lighting control device with an automatic operation setting information, wherein the automatic operation setting information includes information of at least one lighting device of the first through nth lighting devices to be turned-on automatically and an automatic operation scenario of the at least one lighting device.

8. The method of claim 7, further comprising:
   driving, by the lighting control device, the at least one lighting device according to the automatic operation scenario when the first wireless connection is established between the first mobile device and the lighting control device and an automatic detection mode is enabled; and
   turning-off, by the lighting control device, the at least one lighting device when the first wireless connection is disconnected between the first mobile device and the lighting control device and the automatic detection mode is enabled.

9. The method of claim 7, wherein the first mobile device determines one of a plurality of operation scenarios as the automatic operation scenario based on a user input.

10. The method of claim 1, wherein the performing, by the lighting control device, the second time synchronization with the second mobile device comprises:
    providing, by the second mobile device, a second master current time to the lighting control device, when the second wireless connection is established between the second mobile device and the lighting control device; and
    determining, by the lighting control device, the current time based on the second master current time and an elapsed time that elapses from a time point at which the lighting control device receives the second master current time.

11. The method of claim 1, wherein the lighting control device is connected to each of the first through nth lighting devices through a wiring.

12. The method of claim 1, wherein the first mobile device and the lighting control device perform wireless communication with each other according to a Bluetooth Low Energy protocol.

13. A method of operating a smart lighting system including a first mobile device, a lighting control device, and first through nth lighting devices, the method comprising:
- establishing a first wireless connection between the first mobile device and the lighting control device;
- performing, by the lighting control device, a first time synchronization including:
  - receiving, from the first mobile device, a first master current time, when the first wireless connection is established between the first mobile device and the lighting control device, and
  - calculating, by the lighting control device, a current time based on the first master current time and an elapsed time that elapses from a time point at which the lighting control device receives the first master current time;
- receiving, by the lighting control device, scheduling information for each of the first through nth lighting devices;
- storing, in a memory of the lighting control device, the scheduling information;
- controlling, by the lighting control device, operation of the first through nth lighting devices based on the current time calculated by the lighting control device and the scheduling information stored in the memory of the lighting control device,
- establishing, by a second mobile device, a second wireless connection with the lighting control device;
- performing, by the lighting control device, a second time synchronization with the second mobile device;
- providing, by the lighting control device, the scheduling information to the second mobile device; and
- updating, by the second mobile device, the scheduling information to provide updated scheduling information to the lighting control device,
- wherein n is a positive integer greater than 1.

14. The method of claim 13, wherein the receiving, by the lighting control device, the scheduling information further comprises:
- receiving, by the lighting control device, the scheduling information through a wireless communication via the first wireless connection.

15. The method of claim 13, wherein the scheduling information includes a turn-on timing of each of the first through nth lighting devices, an operation scenario of each of the first through nth lighting devices during a period when each of the first through nth lighting devices is turned-on, and a turn-off timing of each of the first through nth lighting devices.

16. The method of claim 13, wherein the controlling, by the lighting control device, the operation of the first through nth lighting devices comprises:
- driving a kth lighting device of the first through nth lighting devices based on a kth operation scenario of the kth lighting device when the current time matches a kth turn-on timing of the kth lighting device; and
- turning-off, by the lighting control device, the kth lighting device, when the current time matches a kth turn-off timing of the kth lighting device,
- wherein the kth turn-on timing and the kth turn-off timing are included in the scheduling information, and
- wherein k is a positive integer smaller than or equal to n.

17. The method of claim 13, further comprising:
- receiving, by the lighting control device, an automatic operation setting information, wherein the automatic operation setting information includes information of at least one lighting device of the first through nth lighting devices to be turned-on automatically and an automatic operation scenario of the at least one lighting device.

18. The method of claim 17, further comprising:
- driving, by the lighting control device, the at least one lighting device according to the automatic operation scenario when the first wireless connection is established between the first mobile device and the lighting control device and an automatic detection mode is enabled; and
- turning-off, by the lighting control device, the at least one lighting device when the first wireless connection is disconnected between the first mobile device and the lighting control device and the automatic detection mode is enabled.

19. The method of claim 13, wherein the performing, by the lighting control device, the second time synchronization with the second mobile device comprises:
- providing, by the second mobile device, a second master current time to the lighting control device, when the second wireless connection is established between the second mobile device and the lighting control device; and
- determining, by the lighting control device, the current time based on the second master current time and an elapsed time that elapses from a time point at which the lighting control device receives the second master current time.

* * * * *